(12) United States Patent
Han et al.

(10) Patent No.: US 10,508,949 B2
(45) Date of Patent: Dec. 17, 2019

(54) DATA ACQUISITION DEVICE FOR OPTICAL COMPENSATION

(71) Applicant: BOE TECHNOLOGY GROUP CO., LTD., Beijing (CN)

(72) Inventors: Dongxu Han, Beijing (CN); Tieshi Wang, Beijing (CN); Chi Zhang, Beijing (CN); Wenchao Bao, Beijing (CN); Min He, Beijing (CN); Pan Xu, Beijing (CN); Yongqian Li, Beijing (CN); Kun Cao, Beijing (CN); Yue Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/655,953

(22) Filed: Jul. 21, 2017

(65) Prior Publication Data
US 2018/0031419 A1   Feb. 1, 2018

(30) Foreign Application Priority Data

Jul. 28, 2016 (CN) .................. 2016 2 0817673 U

(51) Int. Cl.
*G01J 1/42* (2006.01)
*G01J 1/02* (2006.01)
*G01J 1/44* (2006.01)

(52) U.S. Cl.
CPC .......... *G01J 1/4228* (2013.01); *G01J 1/0223* (2013.01); *G01J 1/44* (2013.01); *G01J 2001/4247* (2013.01)

(58) Field of Classification Search
CPC .......... G01J 1/4228; G01J 1/0223; G01J 1/44; G01J 1/4247
USPC .......................................... 356/222
See application file for complete search history.

(56) References Cited

U.S. PATENT DOCUMENTS

| | | | |
|---|---|---|---|
| 2002/0008868 A1* | 1/2002 | Kubota | G01J 1/04 356/121 |
| 2002/0018249 A1* | 2/2002 | Yamakawa | G01J 1/00 358/475 |
| 2009/0177426 A1* | 7/2009 | Dodds | G01J 1/08 702/85 |
| 2011/0268344 A1* | 11/2011 | Chan | G01N 21/9505 382/145 |
| 2012/0188485 A1* | 7/2012 | Cheon | G02B 6/0068 349/65 |
| 2015/0365555 A1* | 12/2015 | Kinoshita | H04N 1/02885 358/484 |
| 2016/0027354 A1* | 1/2016 | Terai | G09G 3/36 345/87 |

* cited by examiner

*Primary Examiner* — Hina F Ayub
(74) *Attorney, Agent, or Firm* — Calfee, Halter & Griswold LLP

(57) ABSTRACT

Disclosed is a data acquisition device for optical compensation including a platform for carrying a display panel; and a linear image acquisition module located above the platform. The linear image acquisition module is movable relative to the platform.

9 Claims, 1 Drawing Sheet

DATA ACQUISITION DEVICE FOR OPTICAL COMPENSATION

CROSS-REFERENCE TO RELATED APPLICATIONS

The present application claims priority to Chinese Patent Application No. 201620817673.0, filed Jul. 28, 2016, and the entire contents of which are incorporated herein by reference.

TECHNICAL FIELD

The present disclosure relates to the field of display technology, and more particularly, to a data acquisition device for optical compensation.

BACKGROUND

At present, with the increase of size and resolution of a LCD panel, the problem of uneven luminance of a display screen is more and more prominent. At present, the main technology for solving the problem of the uneven luminance of a display screen is an optical compensation technology, and the optical compensation technology is based on the acquisition of luminance data of the display screen. In the related art, the acquisition of the luminance data of the display screen is mainly performed by obtaining luminance information of the screen using an area array image sensor (CCD) by a distance, and then calibrating luminance data by a point luminance meter. The advantage of this kind of luminance data acquisition method lies in that the way of obtaining data is convenient and quick, but there are also obvious defects in this kind of acquisition method. As the increase of the size of the display screen, the distance from the CCD to the display screen needs to be increased. Thus, the image resolution collected by the CCD is reduced, and the collected image is also prone to generate a moire pattern or is affected by other light sources, resulting in a lower accuracy of the resulting full-screen luminance data.

SUMMARY

According to an aspect of the present disclosure, there is provided a data acquisition device for optical compensation, including: a platform for carrying a display panel; and a linear image acquisition module located above the platform, the linear image acquisition module being movable relative to the platform.

In one embodiment, a distance between the linear image acquisition module and the display panel carried on the platform in a direction perpendicular to the platform is 0-50 mm.

In one embodiment, the linear image acquisition module is movable relative to the platform in one-dimensional direction, and an extending direction of the linear image acquisition module is perpendicular to a movement direction thereof relative to the platform.

In one embodiment, the platform is a fixed mechanism; and each of the linear image acquisition modules is movable in a direction perpendicular to the extending direction thereof.

In one embodiment, the data acquisition device for optical compensation further includes a driving device for driving a movement of the linear image acquisition module.

In one embodiment, the linear image acquisition module is a fixed mechanism, and the platform is movable in a direction perpendicular to the extending direction of the linear image acquisition module.

In one embodiment, the data acquisition device for optical compensation further includes a conveyor unit for driving a movement of the platform.

In one embodiment, the data acquisition device for optical compensation includes a plurality of the linear image acquisition modules, and the plurality of linear image acquisition modules are sequentially arranged along a relative movement direction between the platform and each of the plurality of linear image acquisition modules.

In one embodiment, each of the plurality of linear image acquisition modules is a linear image sensor.

In one embodiment, the data acquisition device for optical compensation further includes a point luminance meter provided corresponding to the linear image acquisition module, and the point luminance meter is electrically connected to the corresponding linear image acquisition module.

DETAILED DESCRIPTION

Hereinafter, the technical solutions in the embodiments of the present disclosure will be described clearly and completely in conjunction with the accompanying drawings in the embodiments of the present disclosure, and it will be apparent that the described embodiments are merely part of the embodiments of the present disclosure and not all of the embodiments. All other embodiments obtained by those skilled in the art based on the embodiments of the present disclosure without paying inventive work are within the scope of the present disclosure.

Figure 1:
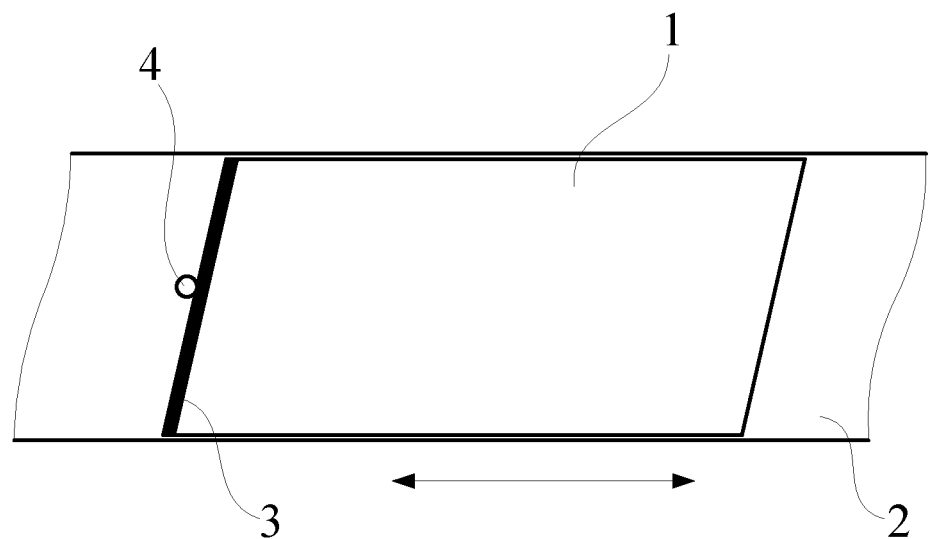
FIG. 1 is a schematic diagram of a structure of a data acquisition device for optical compensation provided by an embodiment of the present disclosure.
Figure 2:
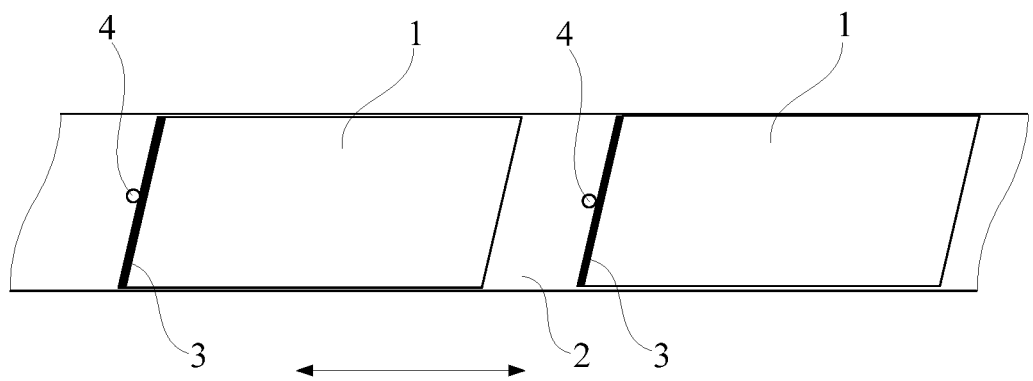
FIG. 2 is a schematic diagram of a structure of a data acquisition device for optical compensation provided by another embodiment of the present disclosure.

As shown in FIGS. 1 and 2, the data acquisition device for optical compensation provided by the embodiment of the present disclosure includes a platform 2 for carrying a display panel 1; and a linear image acquisition module 3 located above the platform 2, wherein a relative movement may be carried out between the linear image acquisition module 3 and the platform 2.

The above-described data acquisition device for optical compensation includes the platform 2 for carrying the display panel 1 and the image acquisition module 3 for collecting luminance information of the display panel 1. The image acquisition module 3 has a linear structure, and the relative movement may be performed between the platform 2 and the image acquisition module 3. By utilizing the relative movement between the platform 2 and the image collecting module 3, luminance information of individual areas of the display panel 1 may be scanned and collected, such that it is unnecessary to increase a distance from a CCD to a large-size display panel when collecting the luminance of the display panel, thus the accuracy of the collected luminance data of the large-size display panel can be guaranteed.

As shown in FIGS. 1 and 2, in a specific example, in a direction perpendicular to the platform 2, a distance between the linear image acquisition module 3 and the display panel 1 carried on the platform 2 may be 0-50 mm, and particularly, the distance may be 3-10 mm. This range of the distance allows the linear image acquisition module 3 to collect the luminance image of the display panel 1 at a relative high resolution, and it is possible to effectively prevent the collected image from producing a moire pattern, so that the accuracy of luminance data collection of the display panel 1 can be further ensured.

As shown in FIGS. 1 and 2, in a specific example, in the data acquisition device for optical compensation, the platform 2 and the linear image acquisition module 3 may move relative to each other in one-dimensional direction (e.g., the one-dimensional direction indicated by a line segment with arrows as shown in FIG. 1), and an extending direction of the linear image acquisition module 3 may be perpendicular to the one-dimensional relative movement direction.

The extending direction of the linear image acquisition module 3 is perpendicular to the relative movement direction of the platform 2 and the linear image acquisition module 3 (e.g., the one-dimensional direction indicated by a line segment with arrows as shown in FIG. 1), so that the scanning of the display panel 1 can be completed by the linear image acquisition module 3 more quickly.

On the basis of the above embodiment, as shown in FIGS. 1 and 2, in a specific example, the platform 2 and the linear image acquisition module 3 may relatively move in one-dimensional direction. Specifically, the platform 2 is a fixed mechanism, and the linear image acquisition module 3 may move in a direction perpendicular to the extending direction thereof, thereby the movement in one-dimensional direction of the linear image acquisition module 3 relative to the platform may be realized. In this way, due to the linear structure of the linear image acquisition module 3 itself and its movement in one-dimensional direction, the detection method can be more flexible. For example, during the detection, the image of the display panel 1 may be illuminated line by line, or may be illuminated sequentially in a unit of multiple lines, so that the movement of the linear image acquisition module 3 in the one-dimensional direction may be well matched with the illuminated image, and the detected picture is less disturbed, thereby improving the accuracy of the detection.

Further, in the present embodiment, the data acquisition device for optical compensation may further include a driving device for driving the linear image capturing module 3 to move.

In one embodiment, the platform 2 and the linear image acquisition module 3 may relatively move in one-dimensional direction. Specifically, the linear image acquisition module 3 is a fixed mechanism, and the platform 2 may move in a direction perpendicular to the extending direction of the linear image acquisition module 3, thereby the platform 2 may move in one-dimensional direction with respect to the linear image acquisition module 3.

In one embodiment, the data acquisition device for optical compensation may further include a conveyor unit for driving the platform 2 to move. The process of scanning the luminance information of the display panel 1 may be streamlined in a manner of moving the platform 2 via a conveyor belt unit, thereby improving operation efficiency.

As shown in FIG. 2, on the basis of the above embodiments, the data acquisition device for optical compensation of the present disclosure may include a plurality of linear image acquisition modules 3, and the plurality of linear image acquisition modules 3 may be arranged sequentially along the relative movement direction of the platform 2 and each of the linear image acquisition modules 3.

By using the plurality of linear image acquisition modules, the multi-grayscale scanning of the display panel 1 may be realized; and the plurality of linear image acquisition modules 3 are arranged in order along the relative movement direction of the platform 2 and each linear image acquisition module 3, which enables the streamlined operation of the multi-grayscale scanning process of the display panel 1, thereby improving operation efficiency.

As shown in FIGS. 1 and 2, in one embodiment, the linear image acquisition module 3 may be a linear image sensor.

As shown in FIGS. 1 and 2, in one embodiment, the data acquisition device for optical compensation of the present disclosure may further include point luminance meter(s) 4 provided in correspondence with the linear image acquisition module(s) 3, and the point luminance meter 4 is electrically connected to a corresponding linear image acquisition module 3 for calibrating the luminance information acquired by the linear image acquisition module 3 corresponding to this point luminance meter 4, thereby obtaining a group of luminance data of the display panel 1.

It should be noted that the data acquisition device for optical compensation of the present disclosure is applicable not only to a planar liquid crystal panel (open cell form and module), an OLED (Organic Light Emitting Diode) panel and a super module, but also to a liquid crystal module of a curved surface and an OLED super module.

It will be apparent to those skilled in the art that various modifications and variations can be made in the embodiments of the present disclosure without departing from the spirit and scope of the present disclosure. In this way, the present disclosure is intended to embrace such variations and variations if these modifications and variations of this disclosure are within the scope of the present disclosure and the equivalents thereof.

The invention claimed is:

1. A data acquisition device for optical compensation comprising:
   a platform for carrying an LCD display panel; and
   a linear image linear acquisition module located above the platform, the linear image acquisition module being of a linear structure and movable relative to the platform, and the linear image acquisition module is configured to collect luminance information of one or more lines of pixels of the LCD display panel at once,
   where the linear image acquisition module is movable relative to the platform in a single one-dimensional direction, and an extending direction of the linear image acquisition module is perpendicular to a movement direction thereof relative to the platform,
   where the single one-dimensional direction is a linear direction parallel to an extension direction of the platform, and
   where the luminance information is data for the optical compensation of the LCD display panel.

2. The data acquisition device for optical compensation according to claim 1, wherein a distance between the linear image acquisition module and the LCD display panel carried on the platform in a direction perpendicular to the platform is 0-50 mm.

3. The data acquisition device for optical compensation of claim 1, wherein the platform is a fixed mechanism; and the linear image acquisition module is movable in a direction perpendicular to the extending direction thereof.

4. The data acquisition device for optical compensation of claim 3, further comprising a driving device for driving a movement of the linear image acquisition module.

5. The data acquisition device for optical compensation of claim 1, wherein the linear image acquisition module is a fixed mechanism; and the platform is movable in a direction perpendicular to the extending direction of the linear image acquisition module.

6. The data acquisition device for optical compensation of claim 5, further comprising a conveyor unit for driving a movement of the platform.

7. The data acquisition device for optical compensation of claim 1, comprising a plurality of said linear image acquisition modules, wherein said plurality of linear image acquisition modules are sequentially arranged along a relative movement direction between the platform and each of said plurality of linear image acquisition modules.

8. The data acquisition device for optical compensation of claim 7, wherein each of said plurality of linear image acquisition modules is a linear image sensor.

9. The data acquisition device for optical compensation of claim 1, further comprising a point luminance meter provided corresponding to the linear image acquisition module, wherein the point luminance meter is electrically connected to the corresponding linear image acquisition module.

* * * * *